United States Patent
Stavely

(10) Patent No.: US 7,098,949 B2
(45) Date of Patent: Aug. 29, 2006

(54) APPARATUS AND METHOD FOR IMPROVED-RESOLUTION DIGITAL ZOOM IN A PORTABLE ELECTRONIC IMAGING DEVICE

(75) Inventor: Donald J. Stavely, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 847 days.

(21) Appl. No.: 10/208,125

(22) Filed: Jul. 29, 2002

(65) Prior Publication Data
US 2004/0017491 A1    Jan. 29, 2004

(51) Int. Cl.
*H04N 5/262* (2006.01)
(52) U.S. Cl. .................................. 348/240.2
(58) Field of Classification Search ............... None
See application file for complete search history.

(56) References Cited
U.S. PATENT DOCUMENTS

| | | | |
|---|---|---|---|
| 4,442,457 A | 4/1984 | Pines | |
| 4,962,429 A * | 10/1990 | Lemonier | 348/340 |
| 5,243,433 A * | 9/1993 | Hailey | 348/240.2 |
| 5,359,363 A | 10/1994 | Kuban et al. | |
| 5,489,940 A | 2/1996 | Richardson et al. | |
| 5,751,863 A | 5/1998 | Farr | |
| 6,211,911 B1 * | 4/2001 | Komiya et al. | 348/218.1 |

FOREIGN PATENT DOCUMENTS

JP            07067025           3/1995

OTHER PUBLICATIONS

Search Report—France, dated Apr. 8, 2005.

* cited by examiner

*Primary Examiner*—David L. Ometz
*Assistant Examiner*—Adam L Henderson
(74) *Attorney, Agent, or Firm*—Thomas M. Croft

(57) ABSTRACT

A portable electronic imaging device, in performing digital zoom, exploits barrel distortion in the original digital image to produce higher quality digitally zoomed images than can be obtained by simple cropping and rescaling. Such a portable electronic imaging device may be implemented using a moderately wide-angle lens of fixed focal length.

32 Claims, 7 Drawing Sheets

APPARATUS AND METHOD FOR IMPROVED-RESOLUTION DIGITAL ZOOM IN A PORTABLE ELECTRONIC IMAGING DEVICE

FIELD OF THE INVENTION

The present invention relates generally to electronic imaging devices and more specifically to apparatuses and methods for providing an improved-resolution digital zoom capability in a portable electronic imaging device such as a digital camera or digital video camera.

BACKGROUND OF THE INVENTION

Portable electronic imaging devices such as digital cameras or digital video cameras often include a zoom feature. This feature may be provided optically, through the use of a zoom lens, or by cropping (and possibly rescaling) the digital image. The latter method is often referred to as "digital zoom."

Though simple and inexpensive to implement, digital zoom has a major disadvantage: loss of resolution upon rescaling to a larger image size. A digital image may be scaled to a larger image size by using the existing pixel information to estimate the added pixels. The simplest method replicates the value of the nearest neighbor pixel. More sophisticated techniques use interpolation to generate an intermediate pixel value from several neighboring pixels. Bilinear and bicubic interpolation are examples of these techniques. Every rescaling method, particularly pixel replication, produces an image that suffers in quality at high zoom factors, even if the portable electronic imaging device has reasonably high resolution. Providing the portable electronic imaging device with even higher resolution to compensate for digital zoom adds to the cost of the device. Although an optical zoom lens avoids the major disadvantage of digital zoom, an optical zoom lens may add bulk, weight, and cost to the portable electronic imaging device.

It is thus apparent that there is a need in the art for an improved-resolution digital zoom capability in a portable electronic imaging device.

SUMMARY OF THE INVENTION

A portable electronic imaging device having an improved-resolution digital zoom capability is provided. An associated method for providing an improved-resolution digital zoom capability in a portable electronic imaging device is also provided.

Other aspects and advantages of the present invention will become apparent from the following detailed description, taken in conjunction with the accompanying drawings, illustrating by way of example the principles of the invention.

DETAILED DESCRIPTION OF THE INVENTION

The quality of the image obtained from digital zoom may be improved by generating an optical image prior to digitization using a lens that has a higher magnification factor near its center than at its edges. Such a lens is said to cause "barrel distortion" in the resulting image. Throughout this description, the "resolution" of a digital image refers to the number of picture elements (pixels) per linear unit of measurement of the target optical image from which it is generated. When the barrel-distorted optical image is subsequently digitized, the central region corresponding to higher lens magnification thus has higher resolution than the edge region. Therefore, that central region of the distorted image may be cropped and resealed with less loss of quality than would result with a conventional (undistorted) image. Further, the barrel distortion in the distorted image may be corrected using mathematical techniques well known in the image processing art. The correction may be performed either before or after cropping.

This approach to the implementation of digital zoom allows, for example, a moderately wide-angle lens of fixed focal length (e.g., 28 mm equivalent, using 35 mm camera terminology) with high barrel distortion to be used in providing a 3× digital zoom. A digital camera equipped with the resulting 28–85 mm equivalent digital zoom may be very compact, inexpensive to produce, and highly usable and attractive to the consumer.

Figure 1A:
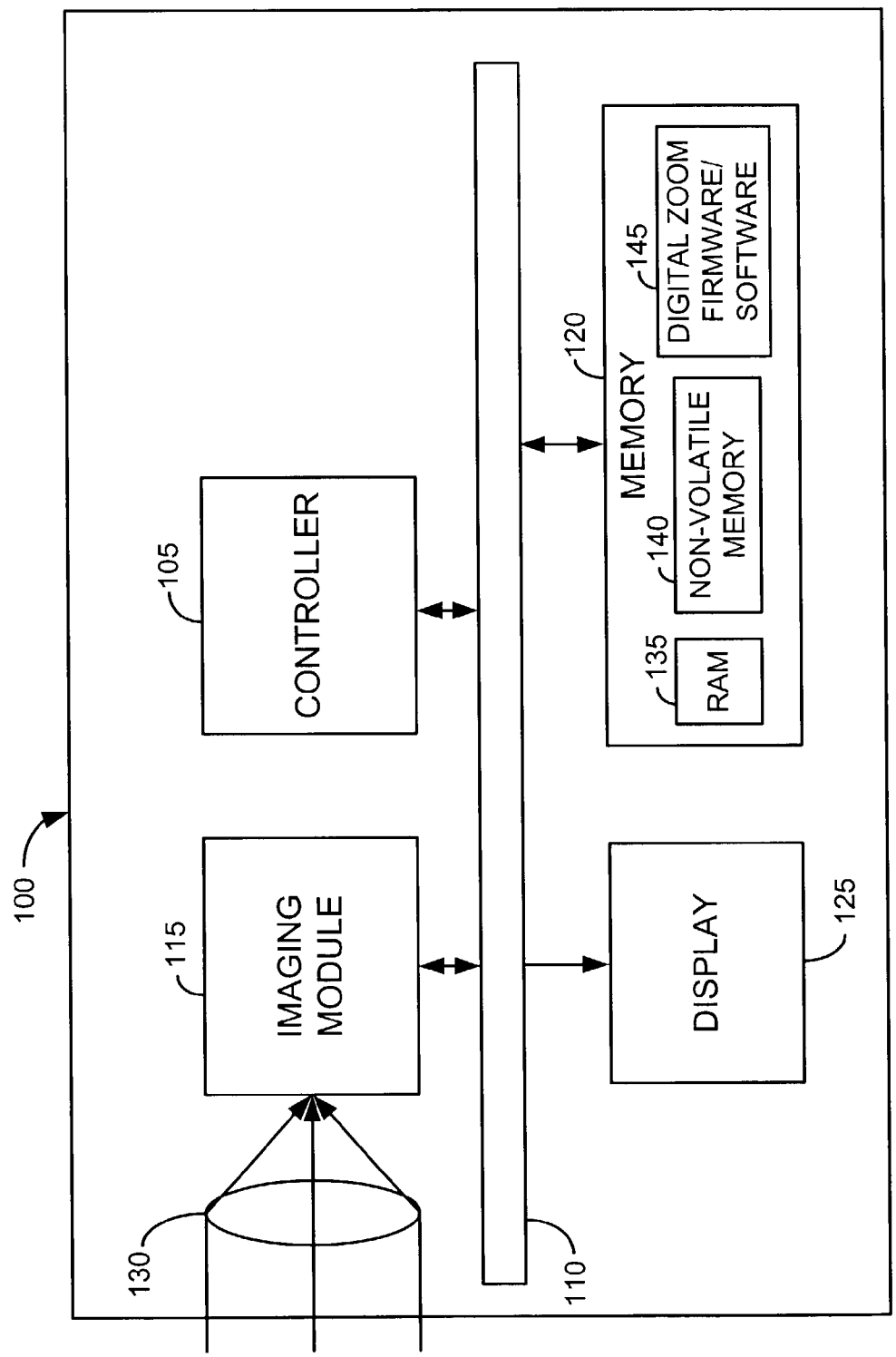
FIGS. 1A and 1B are functional block diagrams of a portable electronic imaging device in accordance with an illustrative embodiment of the invention.
Figure 1B:
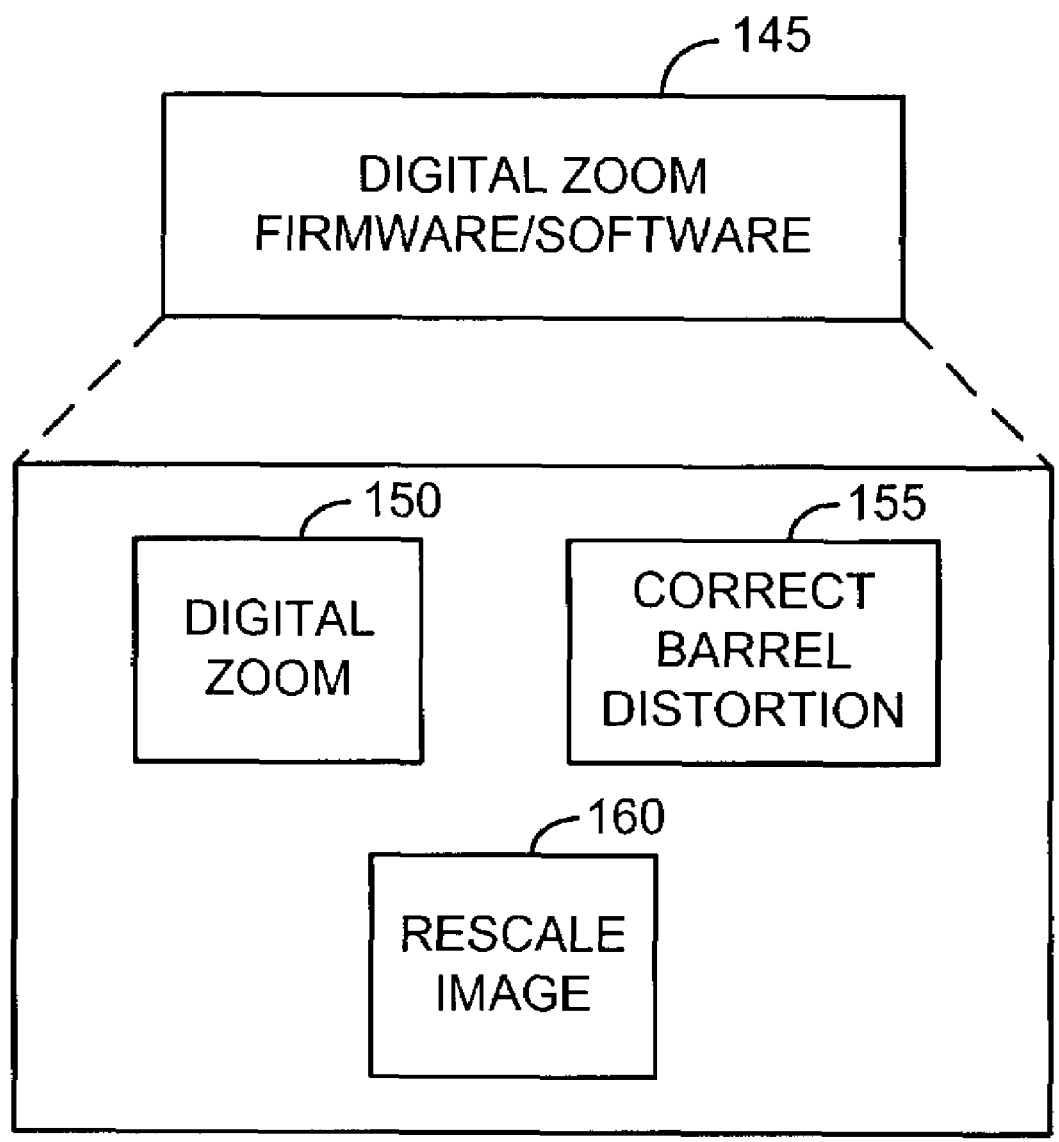

FIGS. 1A and 1B are functional block diagrams of a portable electronic imaging device 100 in accordance with an illustrative embodiment of the invention. Portable electronic imaging device 100 may be a digital camera, digital video camera, or any other portable electronic imaging device that digitizes optical images. In FIG. 1A, controller 105 communicates over data bus 110 with imaging module 115, memory 120, and display 125. Lens 130 produces optical images that are converted to digital images by imaging module 115. Lens 130 is selected so as to intentionally introduce barrel distortion in the optical images it produces. That is, lens 130 has a higher magnification factor near its center than at its edges. Memory 120 further comprises random access memory (RAM) 135, non-volatile memory 140, and digital zoom firmware/software 145. Referring to FIG. 1B, Digital zoom firmware/software 145 may include modules "Digital Zoom" 150, "Correct Barrel Distortion" 155, and "Rescale Image" 160. Module Digital Zoom 150 crops a digital image within a central portion of the image having relatively higher resolution than an edge portion in accordance with a desired digital zoom factor.

Module Correct Barrel Distortion 155 corrects for the barrel distortion introduced by lens 130. Barrel distortion correction will be explained further in a later portion of this description. Module Rescale Image 160 enlarges a cropped image by either replicating pixels or, preferably, by interpolation. Pixel replication and interpolation techniques are well known in the digital image processing art. Module Rescale Image 160 may, for example, be used to provide a user of portable electronic imaging device 100 with a preview of a digitally zoomed scene before a final image is captured. Rescaling may also be employed as a post-processing step in some applications. For example, a user may rescale a zoomed digital image to a larger size before printing the image. The functional boundaries characterizing Modules Digital Zoom 150, Correct Barrel Distortion 155, and Rescale Image 160 are purely conceptual. For example, these functions may be implemented as three separate software or firmware modules, as fewer than three software or firmware modules, or in any other fashion that is advantageous, including custom hardware or a combination of hardware and software/firmware.

In a typical implementation, imaging module 115 comprises photosensors based on charge-coupled-device (CCD) or CMOS technology, an analog-to-digital converter (A/D), a gain control, and a digital signal processor (DSP), as is well known in the art (not shown in FIG. 1A). Non-volatile memory 140 may be of the removable type, such as a CompactFlash™, Smart Mediam™, or Secure Digital™ cards. Removable memory is often used for storing digital images that will not fit within the internal memory of portable electronic imaging device 100.

Figure 2A:
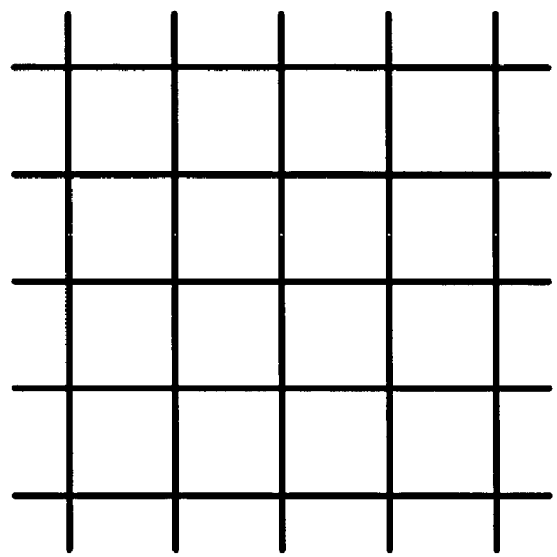
FIG. 2A is an illustration of a uniform grid representing an object of which an optical image is to be made using a lens in accordance with an illustrative embodiment of the invention.
Figure 2B:
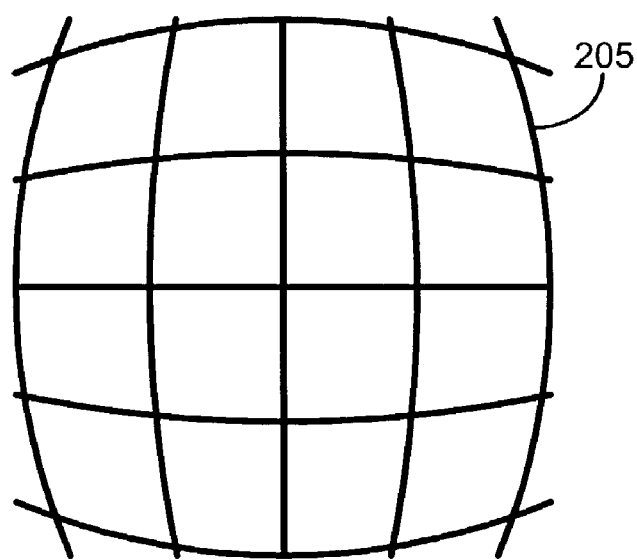
FIG. 2B is an illustration of the uniform grid of FIG. 2A as rendered by a lens causing barrel distortion in accordance with an illustrative embodiment of the invention.

FIG. 2A is an illustration of a uniform grid pattern representing an object of which an optical image is to be made using a lens in accordance with an illustrative embodiment of the invention. FIG. 2B is an illustration of the uniform grid pattern shown in FIG. 2A as rendered by a lens causing barrel distortion, lens 130, in accordance with an illustrative embodiment of the invention. The distortion is caused by lens 130 having a higher magnification factor near its center than at its edges. Such distortion may be characterized and corrected using techniques that are well known in the digital image processing art. For example, one method is disclosed in U.S. Pat. No. 5,751,863 to Farr. Geometric distortion correction in general, including the correction of barrel distortion, is also explained in William K. Pratt, *Digital Image Processing*, John Wiley & Sons, Inc., New York City, N.Y., 1978, pp. 429–432. One approach called "spatial warping" described in Pratt involves fitting a polynomial curve to each distorted grid line 205 in FIG. 2B in the horizontal and vertical direction and then computing an inverse correction function for each cell defined by the intersecting grid lines.

Geometric distortion correction is also discussed in U.S. Pat. No. 5,359,363 to Kuban et. al. In Kuban et. al, a fisheye or other wide-angle lens is used in maintaining video surveillance of a large area (e.g., a 180-degree hemispherical field of view). The system described in Kuban et. al provides the functions of pan, tilt, rotation, and zoom (magnification) throughout the selected field of view without the need to reposition the video camera mechanically. A wide-angle lens such as that employed in Kuban et. al introduces barrel distortion similar to that shown in FIG. 2B. In the Kuban reference, one or more portions of the wide, circular field of view are selected, and a mathematical transformation is performed on each selected portion to correct for barrel distortion. Although the Kuban et. al reference discloses producing an optical image using a lens that introduces barrel distortion, cropping a wide field of view to a limited portion in a resulting digital image, and mathematically correcting the barrel distortion in the limited portion, it does not teach using these techniques to obtain an improved-resolution digitally zoomed image such as that produced by the instant invention. The fundamental objective in Kuban et. al is to provide video surveillance of a wide field of view, not to produce an improved-resolution digitally zoomed image.

Figure 3:
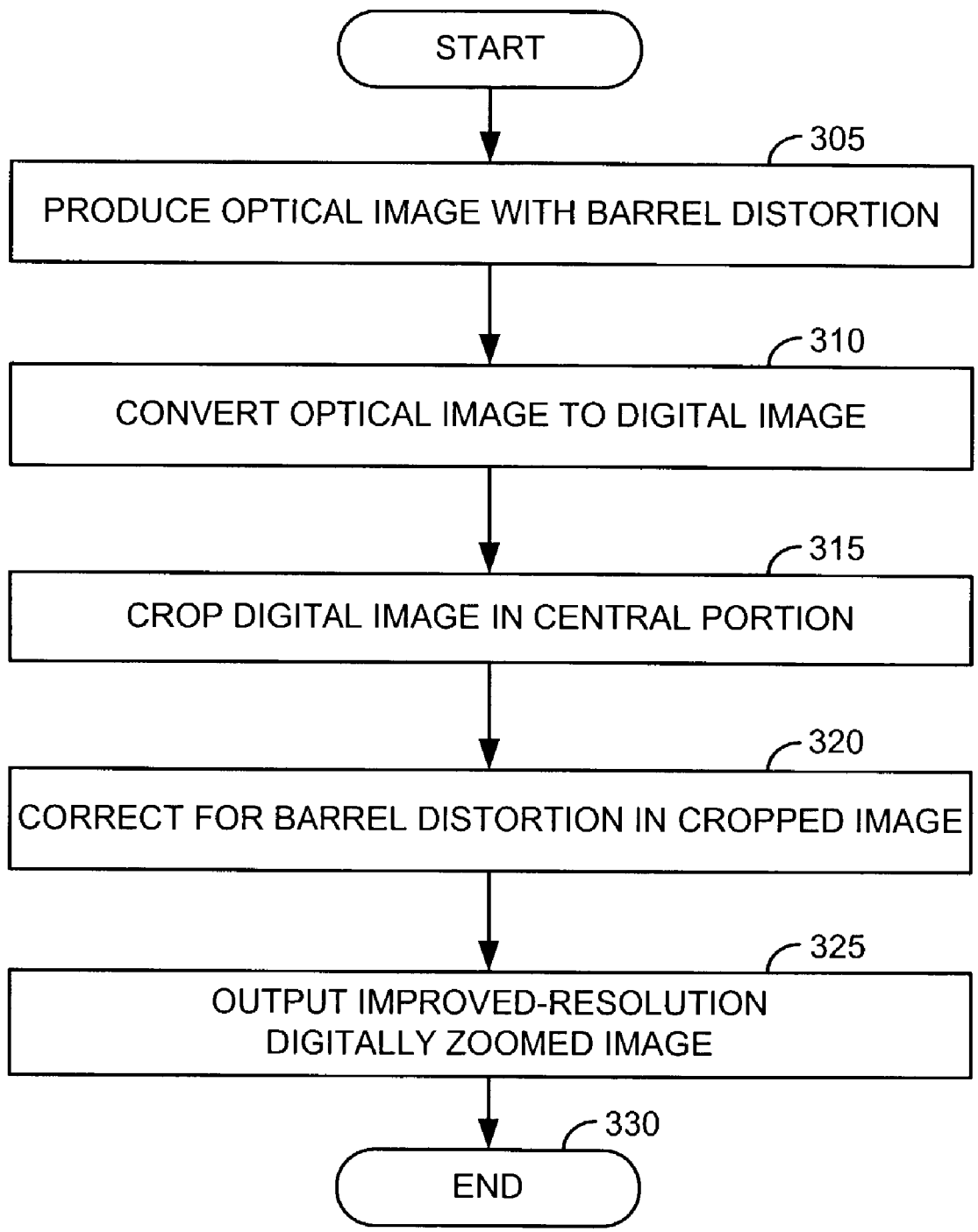
FIG. 3 is a flowchart of a method for providing an improved-resolution digital zoom capability in the portable electronic imaging device shown in FIGS. 1A and 1B.

FIG. 3 is a flowchart of a method for implementing digital zoom in portable electronic imaging device 100 in accordance with an illustrative embodiment of the invention. At 305, lens 130 may be used to produce an optical image containing barrel distortion. Imaging module 115 may then convert the optical image to a digital image at 310. The image produced at 310 has a relatively higher resolution in a central portion corresponding to the higher-magnification central region of lens 130 than in the lower-magnification edge region of lens 130. At 315, module Digital Zoom 150 may digitally zoom (crop) the digital image within its central portion. At 320, module Correct Barrel Distortion 155 may correct the barrel distortion in the cropped image. The resulting improved-resolution digitally zoomed image may then be output at 325, and the process terminates at 330. Optionally, module Rescale Image 160 may be invoked to provide a preview before final image capture or to post process the improved-resolution digitally zoomed image.

Figure 4:
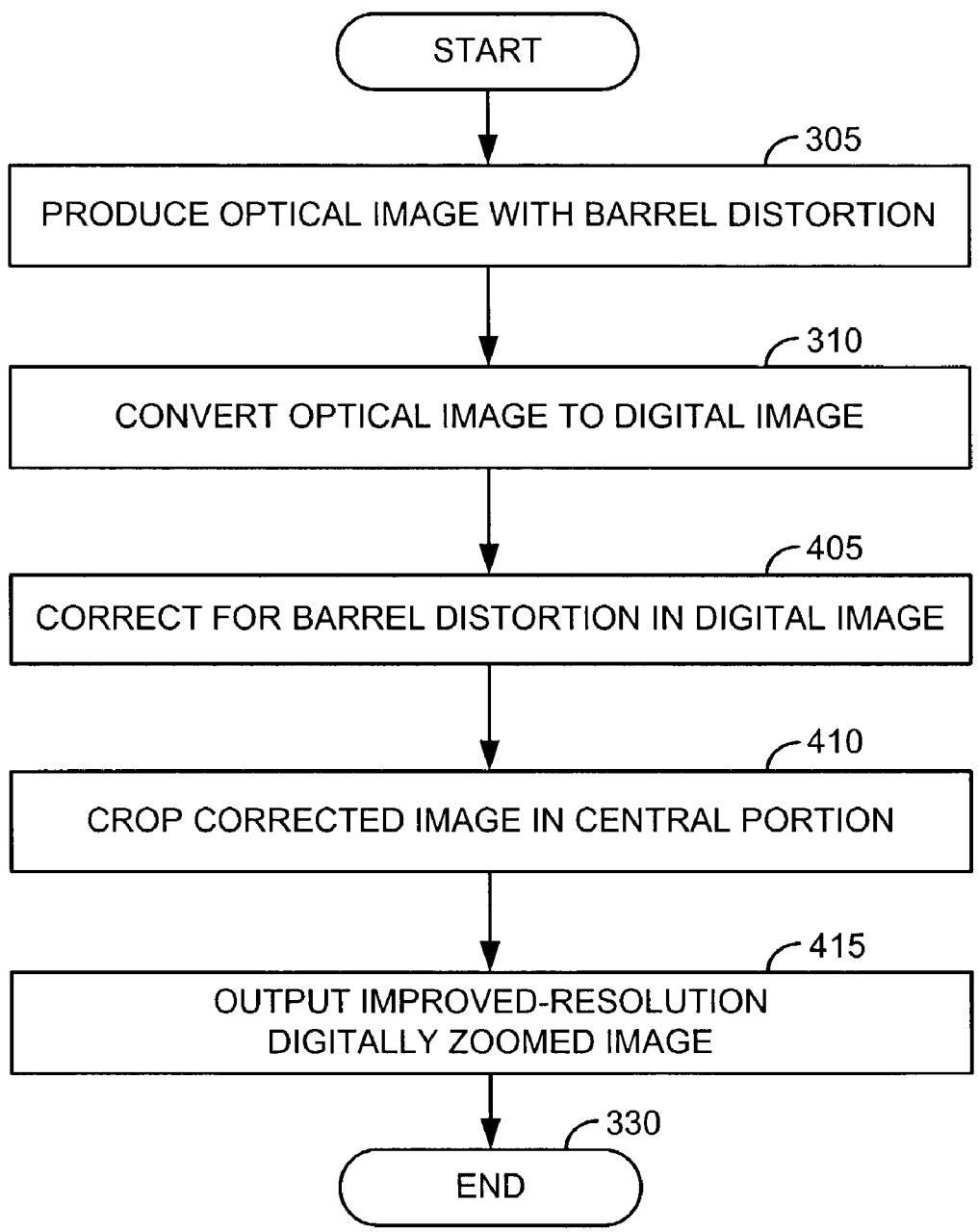
FIG. 4 is a flowchart of another method for providing an improved-resolution digital zoom capability in the portable electronic imaging device shown in FIGS. 1A and 1B.

FIG. 4 is a flowchart of another method for implementing digital zoom in portable electronic imaging device 100 in accordance with an illustrative embodiment of the invention. In FIG. 4, steps 305 and 310 are performed as in FIG. 3. However, module Correct Barrel Distortion 155 corrects the barrel distortion at 405 prior to digital zooming (cropping) of the image at 410 by module Digital Zoom 150. An improved-resolution digitally zoomed image may then be output at 415, and the process terminates at 330. Optionally, module Rescale Image 160 may be invoked to provide a preview before final image capture or to post process the improved-resolution digitally zoomed image.

The order of digital zooming (cropping) and barrel distortion correction is not critical and may be implemented as in FIG. 3 or FIG. 4. The implementation shown in FIG. 3 has the advantage, however, that fewer pixels remain to be processed during the barrel distortion correction step.

Figure 5:
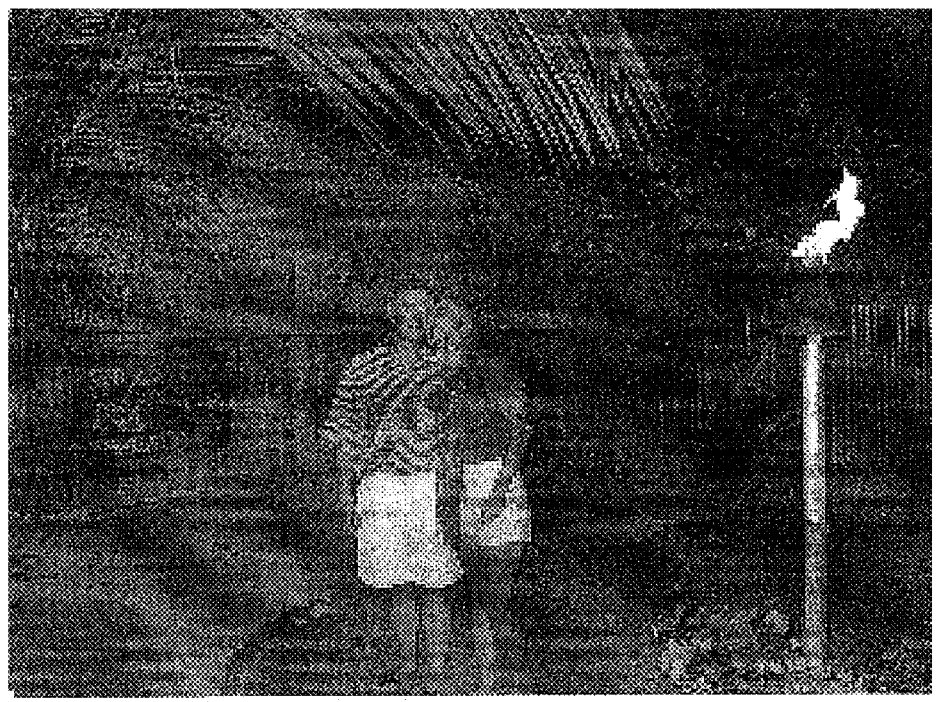
FIG. 5 is an image created using a lens that does not intentionally introduce barrel distortion.
Figure 6:
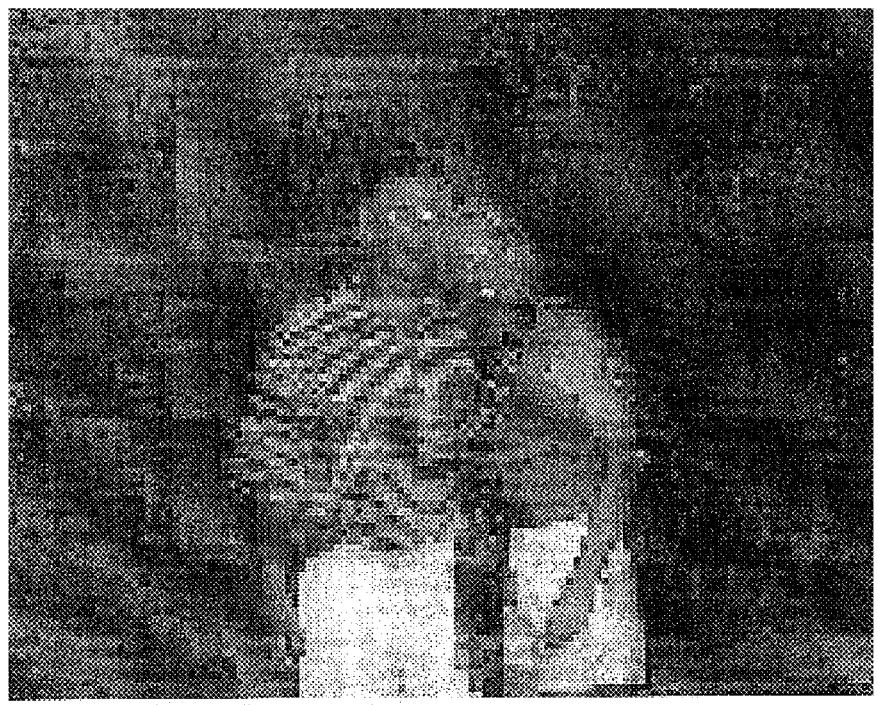
FIG. 6 is a digitally zoomed and rescaled version of the image shown in FIG. 5.
Figure 7:
FIG. 7 is an image created using a lens that introduces a high degree of intentional barrel distortion in accordance with an illustrative embodiment of the invention.
Figure 8:
FIG. 8 is an improved-resolution digitally zoomed and resealed image generated from the image shown in FIG. 7 in accordance with an illustrative embodiment of the invention.

FIGS. 5–8 are images showing the operation of the invention and demonstrating its advantages over conventional digital zoom implementations. (Note that very low resolution images are used in FIGS. 5–8 for purposes of illustration. Typical imaging systems produce images with millions of pixels.) FIG. 5 is a reference digital image captured using a conventional lens without intentional barrel distortion. When the image in FIG. 5 is cropped (digitally zoomed) and rescaled to the original size, noticeable degradation of image quality occurs, as shown in FIG. 6. FIG. 7 is a digital image of the same scene as in FIG. 5 captured at the same CCD resolution as in FIG. 5 using lens 130, which introduces a high degree of barrel distortion, in accordance with an illustrative embodiment of the invention. FIG. 8 is the image in FIG. 7 after cropping (digital zooming), barrel distortion correction, and rescaling to original size in accordance with an illustrative embodiment of the invention. FIG. 8 is of noticeably higher quality than FIG. 6.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A portable electronic imaging device having an improved-resolution digital zoom capability, comprising:
    a lens to produce an optical image, the lens having a higher magnification factor in a central region than in an edge region, the lens thereby causing barrel distortion in the optical image;
    at least one imaging sensor to convert the optical image to a digital image, the digital image having relatively higher resolution in a first portion corresponding to the central region of the lens than in a second portion corresponding to the edge region of the lens;
    first logic to extract a cropped digital image from within the first portion; and
    second logic to correct the barrel distortion in the cropped digital image, the portable electronic imaging device thereby producing an improved-resolution digitally zoomed image.

2. The portable electronic imaging device of claim 1, further comprising:
    third logic to rescale the improved-resolution digitally zoomed image to a predetermined size.

3. The portable electronic imaging device of claim 1, wherein the lens has a fixed focal length.

4. The portable electronic imaging device of claim 1, wherein the portable electronic imaging device comprises a digital camera.

5. The portable electronic imaging device of claim 1, wherein the portable electronic imaging device comprises a digital video camera.

6. A portable electronic imaging device having an improved-resolution digital zoom capability, comprising:
    a lens to produce an optical image, the lens having a higher magnification factor in a central region than in an edge region, the lens thereby causing barrel distortion in the optical image;
    at least one imaging sensor to convert the optical image to a digital image;
    first logic to correct the barrel distortion in the digital image to produce a corrected digital image, the corrected digital image having relatively higher resolution in a first portion corresponding to the central region of the lens than in a second portion corresponding to the edge region of the lens; and
    second logic to extract a cropped digital image from within the first portion, the portable electronic imaging device thereby producing an improved-resolution digitally zoomed image.

7. The portable electronic imaging device of claim 6, further comprising:
    third logic to rescale the improved-resolution digitally zoomed image to a predetermined size.

8. The portable electronic imaging device of claim 6, wherein the lens has a fixed focal length.

9. The portable electronic imaging device of claim 6, wherein the portable electronic imaging device comprises a digital camera.

10. The portable electronic imaging device of claim 6, wherein the portable electronic imaging device comprises a digital video camera.

11. A portable electronic imaging device having an improved-resolution digital zoom capability, comprising:
    means for producing an optical image, the means for producing an optical image causing barrel distortion in the optical image;
    means for converting the optical image to a digital image, the digital image having relatively higher resolution in a first central region than in a second edge region;
    first logic means for extracting a cropped digital image from within the first central region; and
    second logic means for correcting the barrel distortion in the cropped digital image, the portable electronic imaging device thereby producing an improved-resolution digitally zoomed image.

12. The portable electronic imaging device of claim 11, further comprising:
    third logic means for rescaling the improved-resolution digitally zoomed image to a predetermined size.

13. The portable electronic imaging device of claim 11, wherein the means for producing an optical image comprises a lens having a fixed focal length.

14. The portable electronic imaging device of claim 11, wherein the portable electronic imaging device comprises a digital camera.

15. The portable electronic imaging device of claim 11, wherein the portable electronic imaging device comprises a digital video camera.

16. A portable electronic imaging device having an improved-resolution digital zoom capability, comprising:
    means for producing an optical image, the means for producing an optical image causing barrel distortion in the optical image;
    means for converting the optical image to a digital image;
    first logic means for correcting the barrel distortion in the digital image to produce a corrected digital image, the corrected digital image having relatively higher resolution in a first central region than in a second edge region; and
    second logic to extract a cropped digital image from within the first central region, the portable electronic imaging device thereby producing an improved-resolution digitally zoomed image.

17. The portable electronic imaging device of claim 16, further comprising:
    third logic means for rescaling the improved-resolution digitally zoomed image to a predetermined size.

18. The portable electronic imaging device of claim 16, wherein the means for producing an optical image comprises a lens having a fixed focal length.

19. The portable electronic imaging device of claim 16, wherein the portable electronic imaging device comprises a digital camera.

20. The portable electronic imaging device of claim 16, wherein the portable electronic imaging device comprises a digital video camera.

21. A method for providing an improved-resolution digital zoom feature in a portable electronic imaging device, comprising:
    producing an optical image containing barrel distortion;
    converting the optical image to a digital image, the digital image having relatively higher resolution in a first central region than in a second edge region;
    producing a cropped digital image from within the first central region; and correcting for the barrel distortion in the cropped digital image to produce an improved-resolution digitally zoomed image.

22. The method of claim 21, wherein producing an optical image containing barrel distortion comprises forming the optical image using a lens that introduces the barrel distortion.

23. The method of claim 22, wherein the lens has a fixed focal length.

24. The method of claim 21, further comprising:
rescaling the improved-resolution digitally zoomed image to a predetermined size.

25. The method of claim 21, wherein the portable electronic imaging device comprises a digital camera.

26. The method of claim 21, wherein the portable electronic imaging device comprises a digital video camera.

27. A method for providing an improved-resolution digital zoom feature in a portable electronic imaging device, comprising:
producing an optical image containing barrel distortion;
converting the optical image to a digital image;
correcting the barrel distortion in the digital image to produce a corrected digital image, the corrected digital image having relatively higher resolution in a first central region than in a second edge region; and
extracting a cropped digital image from within the first central region to produce an improved-resolution digitally zoomed image.

28. The method of claim 27, wherein producing an optical image containing barrel distortion comprises forming the optical image using a lens that introduces the barrel distortion.

29. The method of claim 28, wherein the lens has a fixed focal length.

30. The method of claim 27, further comprising:
rescaling the improved-resolution digitally zoomed image to a predetermined size.

31. The method of claim 27, wherein the portable electronic imaging device comprises a digital camera.

32. The method of claim 27, wherein the portable electronic imaging device comprises a digital video camera.

* * * * *

UNITED STATES PATENT AND TRADEMARK OFFICE
CERTIFICATE OF CORRECTION

PATENT NO.        : 7,098,949 B2
APPLICATION NO. : 10/208125
DATED             : August 29, 2006
INVENTOR(S)       : Donald J. Stavely Page 1 of 1

It is certified that error appears in the above-identified patent and that said Letters Patent is hereby corrected as shown below:

In column 3, line 28, delete "Smart Mediam™" and insert -- Smart Media™ --, therefor.

Signed and Sealed this

Twelfth Day of May, 2009

JOHN DOLL
*Acting Director of the United States Patent and Trademark Office*